United States Patent [19]

Cavender

[11] Patent Number: 4,579,700
[45] Date of Patent: Apr. 1, 1986

[54] NOVEL PROCESS FOR MAKING FLEXIBLE POLYURETHANE CELLULAR PRODUCTS INCLUDING A NOVEL CELL OPENING TECHNIQUE

[75] Inventor: Keith D. Cavender, Charleston, W. Va.

[73] Assignee: Union Carbide Corporation, Danbury, Conn.

[21] Appl. No.: 549,516

[22] Filed: Nov. 7, 1983

[51] Int. Cl.[4] .................... B29C 67/22; B29C 9/38; B29C 39/10

[52] U.S. Cl. .................... 264/46.4; 249/170; 264/53; 264/54; 264/DIG. 5; 264/DIG. 13; 264/DIG. 15; 425/817 R

[58] Field of Search ............ 264/54, 51, 321, 46.4, 264/53, DIG. 5, DIG. 13, DIG. 15; 425/817 C, 817 R; 249/170

[56] References Cited

U.S. PATENT DOCUMENTS

| | | | |
|---|---|---|---|
| 3,080,613 | 3/1963 | Wall et al. | 425/817 C |
| 3,111,365 | 11/1963 | Hood et al. | 18/48 |
| 3,291,873 | 12/1966 | Eakin | 264/54 |
| 3,475,525 | 10/1969 | Peters | 264/321 X |
| 3,476,933 | 11/1969 | Mendelsohn | 264/321 X |
| 3,523,996 | 8/1970 | Kordiak | 264/321 X |
| 3,556,158 | 1/1971 | Schneider | 264/321 X |
| 3,577,359 | 5/1971 | Carevic et al. | 264/321 X |
| 3,789,094 | 1/1974 | Hutchison | 264/45 |
| 3,844,523 | 10/1974 | Wilheim | 425/113 |
| 3,880,970 | 4/1975 | Dinzburg | 264/54 |
| 3,895,154 | 7/1975 | Kapral | 428/153 |
| 4,035,458 | 7/1977 | Lyman | 264/46.4 |
| 4,285,893 | 8/1981 | Contastin | 264/54 |

FOREIGN PATENT DOCUMENTS 1402718  8/1975  United Kingdom .

OTHER PUBLICATIONS

Alderfer, Sterling, "One-Shot" Polyurethane Production, in *Rubber Age*, Apr. 1963, pp. 89–93.

*Primary Examiner*—Philip Anderson
*Attorney, Agent, or Firm*—Paul W. Leuzzi, II

[57] ABSTRACT

A process for making molded flexible polyurethane cellular products which do not substantially shrink or change dimensionally upon cooling is provided by exposing the curing product to atmospheric pressure while in the confines of the mold. Exposure can be accomplished by unlatching the mold or opening a port at an appropriate time after the reaction mixture was introduced into the mold so as to burst the cell walls of the polyurethane product.

18 Claims, 8 Drawing Figures

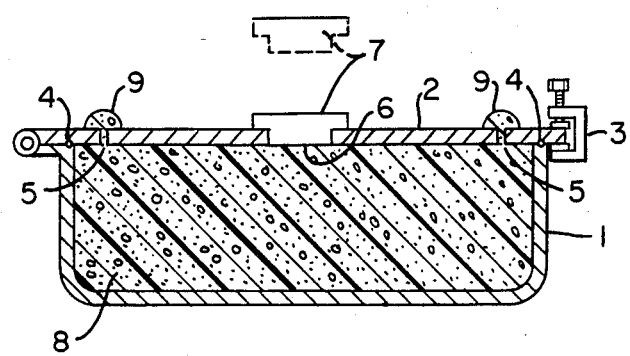
FIG. IA
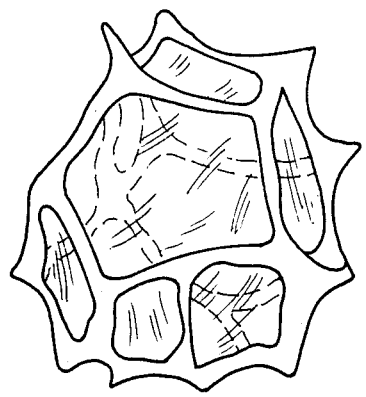
FIG. IB
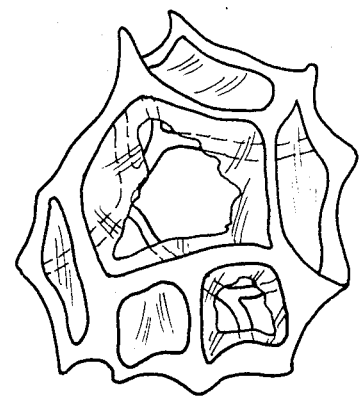
FIG. IC

B    C    D    1    E 1    2    3    4

I  D  5

C  F  6

NOVEL PROCESS FOR MAKING FLEXIBLE POLYURETHANE CELLULAR PRODUCTS INCLUDING A NOVEL CELL OPENING TECHNIQUE

BACKGROUND OF THE INVENTION

1. Field Of The Invention

This invention relates to the molding of cellular plastic products such as polyurethane foam products and more specifically is directed to a novel and useful method for bursting the cells of the foam to avoid shrinkage upon demolding and/or to produce desirable properties including high resiliency in polyurethane foams.

2. Description Of The Prior Art

In the production of molded high resilience polyurethane foam products such as automotive seating, it is necessary to crush or otherwise open the cells of the foam as quickly as possible after molding the product in order to avoid shrinkage. If the cells are not opened, cooling and contraction of gases within the closed cells provides a pressure drop within the closed cells which is sufficient to allow atmospheric pressure acting on the exterior of the cell walls to at least partially collapse the cells to result in undesirable shrinking of the molded product. Opening of the cells also provides a desirable increase in resiliency which is of considerable value in producing cushiony articles such as automotive seating.

A great deal of effort has been expended to devise ways and means for opening the cells of molded polyurethane foam products and several techniques are in current use. In each of the techniques currently employed, the molded foam product is removed from the mold and quickly subjected to the cell opening technique before the gases within the cell have had an opportunity to contract to the point of cell collapse and shrinkage.

One technique being used is to remove the foam product from the mold and quickly spear it with a single-prong or multi-prong air tube and inject air at various locations within the foam product. The injected air is intended to maintain the foam structure and thus avoid shrinkage. Air injection is of limited effectiveness but is either labor-intensive or requires special machinery for injecting the air. It also frequently results in the tearing of the molded foam and in all cases punctures the outer skin of the product.

A much used practice involves removing the molded foam article from the mold and quickly subjecting it to roller crushing. While roller crushing is quite effective in improving the resiliency of the foam article, it is limited to use on articles that contain no three-dimensional reinforcing or support members, for example, automotive seating that contains molded-in steel frames. Vacuum crushing has also been employed with some success but requires special vacuum equipment and high energy costs to operate. As with roller crushing, vacuum crushing requires special handling in quickly removing the foam article from the mold, quickly placing it in a vacuum chamber, applying vacuum and then removing it from the chamber. Roller crushing requires extra rolling equipment and added energy costs to operate. All heretofore known systems also require the consumption of time to provide the bursting of cells.

All mechanical crushing or cell opening techniques employ the application of either an external or an internal force to cause the internal cell pressure to exceed that which the cell windows can contain resulting in window rupture and an effective open cell structure. More specifically, the pressure differential of a specific cell and its environment, i.e., nearest neighbors, is responsible for cell window blowout. The known and commonly used mechanical cell opening techniques of roller crushing, vacuum crushing or air injection all function in this manner and in all cases the technique is employed after demold of the high resilience part.

U.S. Pat. No. 4,285,893 discloses the use of vacuum to burst the cells of a cellular molded product while it is still in the mold to avoid the need for handling the molded product, i.e., removing it from the mold and transferring it to a vacuum chamber for bursting cells. However, the process of the patent requires special vacuum equipment, specially constructed molds and increased energy consumption for operating the vacuum system. Most significantly, the process of the patent retains the molded product within the mold to complete polymerization. i.e., 2 to 5 minutes after the completion of foaming before applying vacuum and thus completely misses the critical time window utilized by this invention for bursting the cells while the product is still in the mold. The process of the patent merely involves the carrying out of the usual well-known vacuum cell bursting technique but applies the vacuum to the molded product while it is still in the closed mold.

No prior art is currently known teaching the utilization of the critical time window discovered by this invention for bursting cells by exposing the molded product to atmospheric pressure at a time when the polyurethane has cured sufficiently to avoid collapse of the cells but has not cured and cooled to the extent that the pressure of gases contained within the cells is not sufficient to burst the cell walls upon exposure to atmospheric pressure.

SUMMARY OF THE INVENTION

This invention is based upon the discovery of the remarkable phenomenon that during the foaming and curing of a flexible polyurethane foam in a closed mold there exists a relatively short period of time when the cell walls of the curing polyurethane foam are sufficiently strong to support the shape of the molded foam and avoid collapse of the molded foam when exposed to atmospheric pressure but are weak enough to burst by the internal pressure of hot expansion gases within the cells and thus open the cells upon exposure to atmospheric pressure. This remarkable phenomenon has been found to occur in all moldable, foamable, flexible polyurethane formulations investigated, although it may occur at different periods in the cure for different formulations. The short period of time during which this phenomenon is evident is herein called the critical time window and extends for 25 or 30 seconds more or less which is more than enough time to unlatch the mold lid or open a port in the mold for exposing the molded foam to atmospheric pressure. The exposure of the curing molded foam product to atmospheric pressure during the critical time window results in the bursting or opening of a substantial proportion of the cells (and, in some cases involving relatively thin molded foamed products, all of the cells) which then precludes the need for hurriedly crushing or otherwise opening the cells upon demolding so as to avoid shrinkage.

In the normal course of events in producing molded flexible polyurethane cellular products, heretofore, the foamable mixture is placed in the mold, is allowed to expand into contact with the confines of the mold and then is allowed to remain in the mold until curing or polymerization of the polyurethane has proceeded sufficiently that the product is strong enough to be handled, e.g., removed from the mold, without permanently distorting it. After removal from the mold the product is quickly subjected to crushing, or cell opening by other means such as vacuum or air injection. Cell opening must be done before the gases within each cell cool sufficiently to contract, sucking in the cell walls and thus resulting in shrinkage. The molded foamed product continues to cure for an extended period of as long as twenty-four hours or longer.

The present invention obviates the heretofore necessary step of crushing or otherwise opening of cells before sufficient cooling has occurred to cause shrinkage. In the present invention, shrinkage is avoided by exposing the molded foamed product to atmospheric pressure during the above described critical time window which, for example, extends from 70 to 100 seconds from the time of mixing the polyisocyanate with the other reactants, e.g., the polyol or polyols, in one particular formulation foamed and molded by means of a machine or, in another example, extends from 85 to 110 seconds for the same formulation foamed and molded manually (bench molded). For other different formulations the critical time window is different.

The new cell opening technique is best defined as timed pressure release (TPR) and utilizes only the normal internal cell pressures in the hot, newly foamed product and requires no post-mold mechanical cell opening operation or energy input. When the external pressure on a molded flexible foam is reduced at the proper time in the in-mold cure cycle by the simple expedient of unlatching the mold lid, it is possible at the conclusion of the normal mold cycle to demold an open celled nonshrinking part requiring no crushing or other cell opening. Timing is critical to avoid collapse, if the foam has not yet developed adequate strength to support itself, or shrinkage if the polymer mass has cured too much at pressure release so as to resist the internal pressure of gases within the cells.

BRIEF DESCRIPTION OF THE DRAWINGS

FIG. 1A illustrates the cross-section of a mold useful in practicing the present invention;

FIG. 1B illustrates a closed cell;

FIG. 1C illustrates an open cell; and

DETAILED DESCRIPTION OF THE DRAWINGS

Figure 2:
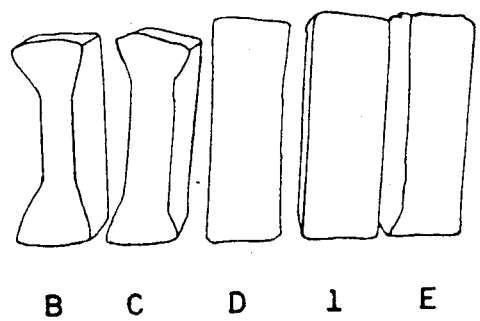
FIGS. 2 through 6 are copies of photographs of comparative molded polyurethane foam specimens illustrating the features of this invention and comparing them with molded polyurethane foam specimens made not persuant to this invention.

FIG. 1A illustrates the cross section of mold (1) having a closeable lid (2), a latching mechanism (3) and a sealing gasket (4). The mold is equipped with air bleed vents (5) which allow for air displacement. In addition the mold also has a port (6) which has a removable plug (7).

The reaction mixture (8) is placed in the mold (1) whose closeable lid (2) is closed by a latching mechanism (3). The reaction mixture (8) expands into contact with the confines of the mold (1), displacing air through the air bleed vents (5). The reaction mixture (8) forms a curing molded polyurethane cellular product containing cells having cell walls of curing flexible polyurethane as shown in FIG. 1B and pressurized expansion gases contained within and supporting these cell walls. Some of the reaction mixture (8) may extrude through the air bleed vents (5) creating exudates (9).

The curing method cellular product is exposed to atmospheric pressure by unlatching the latching mechanism (3) or opening the port (6) via a plug (7) at a point in the time of curing when the cell walls have cured sufficiently to develop enough strength to avoid cell collapse but before the cell walls have cured sufficiently to resist bursting by the pressure of the expansion gases contained within the cell walls when exposed to atmospheric pressure.

Prior to exposing the curing molded cellular product to stmospheric pressure, the cells that make up the molded product are predominantly closed as illustrated by FIG. 1B. After exposure a large proportion of the cells of the expanded polyurethane can be characterized by FIG. 1C where the cell walls are shown to have burst, resulting in an open cell.

FIG. 2 is a copy of a photograph illustrating the effect of timed pressure release pursuant to this invention on bench foams (manually made) made using a low density seat back system. Specimen foam B was demolded in the normal prior art manner in that the mold was only unlatched immediately prior to demold but specimen foam B was not crushed. Specimen foam B illustrates the shrinkage encountered when there is no crushing immediately after demolding before substantial cooling. The remaining specimen foam C through E and specimen foam 1 were demolded at a normal time, e.g., at the same time as specimen B i.e., 8 minutes after polyisocyanate addition, but pressure release was effected at 150 seconds (C), 125 seconds (D), 100 seconds (1) and 75 seconds (E) after isocyanate addition. A slight shrinkage is observed at the 125-second release time specimen foam D with a slight center densification (not visible in FIG. 2). The 100-second release specimen foam 1 shows no measurable shrinkage (its measured thickness is identical to a companion crushed sample (i.e., a sample that was mechanically crushed quickly after demold to avoid shrinkage). At 75 seconds, some foam collapse is observed in specimen foam E indicating that the lower time limit is >75 seconds. Further, sharper definition of the novel "time window" indicates that the limits are 85 to 110 seconds giving a window of 25 seconds. In addition, it has been determined that this window is shifted downward with machine made foams using production tooling. More intense mixing, the heating effects of the larger exotherming reacting mass and the large heat sink nature of the larger mold are believed to be responsibly for the downward shift of the window and the broadening of the window to about 30 seconds. A machine window of 70–100 seconds was observed for the same formulation.

Figure 3:
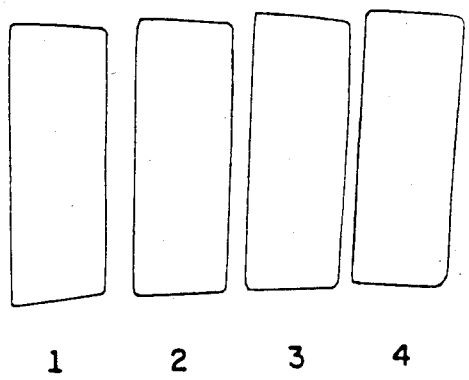
Figure 4:
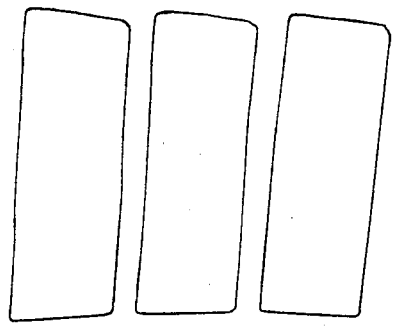

The effect of mold packing (i.e., introducing more than that quantity of foamable mixture than is needed for the foam to just completely fill the mold when foaming is completed) on timed pressure released foams is shown in FIG. 3. A minimum-fill foam (i.e., made from that quantity of foamable mixture that is needed to just completely fill the mold when foaming is completed) is identical in measured thickness to foams packed 6½, 7½ and 10½ percent, respectively, specimen foam 1 through 4. This observation indicates that packing can be utilized as a technique to increase the pressure differential on opposite sides of the cell wall adequately to expand the operating time pressure release window. FIG. 4 shows a 100 second TPR minimum-fill foam (specimen foam 1) which has a 4.95 in. thickness, a 125 second TPR minimum-fill foam (specimen foam D) with a thickness of 4.60–4.85 (localized shrinkage) and a 125 second TPR foam (specimen foam 5) packed 10 percent with a 4.95 in. thickness indicating that the window has been broadened via mold packing.

Figure 5:
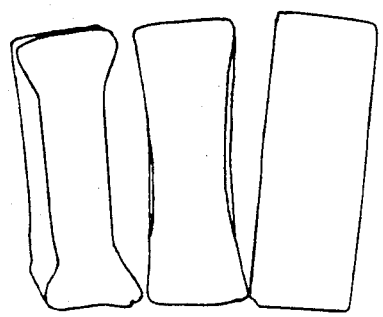

In addition to mold packing, the level of silicone surfactant has been found to affect the cell opening pressure differential across the cell walls. The comparable shrinkage of 1.8 wt. parts (normal level) and 4.0 parts of a silicone surfactant (comprising a blend of an aryl modified dimethylsilicone oil and a polyoxypropylene-polyoxyethylene copolymer diol) per one hundred wt. parts of polyol (and/or polymer/polyol) reactant, with a 150-second TPR is shown in FIG. 5 by specimen foams C and F; significantly less shrinkage being observed at 4.0 wt. parts of the silicone. At a 100-second TPR, no shrinkage was measured (specimen foam 6). TPR critical time window broadening is also demonstrated by FIG. 6 where a 115-second TPR foam (specimen foam G) with standard composition, i.e., 1.8 wt. pts. of the silicone surfactant described in regard to FIG. 5 per 100 wt. pts. of polyol reactant, gave shrinkage (the previously stated upper time limit was 110 seconds). No shrinkage was observed when the silicone level was raised to 4.0 wt. parts per hundred weight parts of polyol reactant in specimen foam 7. Thus, an effective 5 seconds was added to the critical time window.

A close evaluation of foams made with the timed pressure release technique of this invention indicates in most instances that the outer portion of the foam pads are very open-celled with increased tightness of cells observed toward the center. This is readily explained by the fact that the pressure differential that is utilized in opening the cells is also a function of the distance from the outer surface of the molded foam product. As one progresses toward the center of the foam product, fewer and fewer cell windows are ruptured because of a decaying pressure differential as the center of the foam product is approached. This observation does not raise serious questions regarding the practicality of this technique to make noncrushed foam product because the principal reason for crushing is to preclude shrinkage and dimensional changes in the molded product as it is demolded and cooled. TPR as defined by this invention achieves the goal of precluding shrinkage or dimensional change in the molded form product and thus eliminates the need for crushing or other means of cell opening after the product is demolded. Any physical property deficiencies, e.g., in resiliency, porosity or compression set, resulting from residual closed cells after TPR can be eliminated via normal usuage of the product, i.e., by "user" crushing. For example, if the molded foam product is seating, the interior closed cells are readily crushed by sitting on the seating and shifting weight several times for a minute or so. "User" crushing results in higher resiliency and porosity and lower compression set.

The process of this invention comprises the steps of:

1. introducing a liquid foamable flexible polyurethane reaction mixture into a mold;

2. permitting the reaction mixture to expand into contact with the confines of the mold to form a curing molded flexible polyurethane cellular product containing cells having cell walls of curing flexible polyurethane and pressurized expansion gase contained within and supporting the cell walls;

3. exposing the curing molded cellular product to atmospheric pressure while in contact with the confines of the mold at a point in the time of curing of said product when the cell walls thereof have cured sufficiently to develop sufficient strength to avoid collapse of the cells thereof when the product is exposed to atmospheric pressure but exposing said cured cellular product to atmospheric pressure before its cell walls have cured sufficiently to develop sufficient strength to resist bursting by the pressure of the expansion gases contained within the cell walls when exposed to atmospheric pressure;

4. allowing the curing molded flexible polyurethane cellular product to continue to cool and cure in the mold until it has developed sufficient strength to be removed from the mold without permanently distorting its shape, and 5. removing the product from the mold.

The step of exposing the curing product to atmospheric pressure while in contact with the confines of the mold can be easily accomplished by simply unlatching the mold latch at the appropriate time during the critical time window. Alternatively, the exposure to atmospheric pressure can be achieved be providing the mold with one or more closable ports which can be opened at the appropriate time in the critical time window. For example, the port or ports can simply be one or more holes cut through the wall of the mold and provided with closures for the holes so that the initial rising of the foam and molding of the foam occurs while the port is closed. At the desired point during the critical window, the port can be easily opened by opening the closure.

The invention is especially suited to the manufacture of polyurethane cellular products having a solid insert such as a rigid support member, for example, a steel reinforcing member, on the interior of product. Molded flexible polyurethane cellular products having internal reinforcing members of this type cannot be produced by molding and thereafter roller crushing the article because of the rigidity and bulk of the interior reinforcing member or members. Similarly the air injection method of bursting the foam cells is not well suited for internally reinforced foam products because of the risk of spearing the reinforcing member and thereby damaging it and/or the air tube spear. Vacuum crushing is undesirable because of the extremely high energy consumption and handling problems.

As an illustration, the foamable reaction mixture is conveniently prepared by mixing a preblend of all ingredients except the polyisocyanate and fluorocarbon blowing agent and thereafter mixing the preblend with the fluorocarbon blowing agent and the polyisocyanate and quickly introducing the resulting mixture into the mold. The preblend contains ingredients, such as, the polyol which may comprise a polymer/polyol or a mixture of polyol and polymer/polyol; water; catalyst or catalysts; surfactant or surfactants, in addition to any other additives such as pigments or special effects additives. Since none of these ingredients in the preblend inter-react with each other the preblend may be formed well in advance of mixing the polyisocyanate and fluorocarbon blowing agent. However, once the polyol and/or water are contacted with the polyisocyanate the polyurethane-forming or $CO_2$ forming reaction begins.

The fluorocarbon is volatile and it would not be especially useful to add the fluorocarbon to the preblend unless the preblend is to be used right away.

Substantially any polyol used in the art to make polyurethane can be used in making the foamable reaction mixtures used in this invention. Illustrative polyols useful in producing foamable compositions used in this invention are the polyhydroxyalkanes, the polyoxyalklene polyols, or the like. Among the polyols which can be employed are those selected from one or more of the following classes of composition, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids:
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 12,6-trihydroxyhexane, 1, 1, 1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the propylene oxide adducts and the propylene oxide-ethylene oxide adducts of di- and/or trihydroxyalkanes.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbons atoms. Among the polyphenols which are contemplated are found, for example, bisphenol A, bisphenol F, condensation products of phenol and formaldehyde, the novolac resins; condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl members which vary over a wide range and are suitable to provide flexible or semi-flexible polyurethane foams from reaction with polyisocyanate. In general, the hydroxyl members of the polyols employed in the invention can range from about 20, and lower, to about 150, and higher. The hydroxyl number is defined as the number of milligrams of potassium hydroxide required for the complete hydrolysis of the fully acetylated or phthalated derivative prepared from 1 gram of polyol. The hydroxyl number can also be defined by the equation:

$$OH = \frac{56.1 \times 1000 \times f}{m.w.}$$

where
OH = hydroxyl number of the polyol
f = functionality, that is, average number of hydroxyl groups per molecule of polyol
m.w. = molecular weight of the polyol The exact polyol employed depends upon the end-use of the polyurethane product to be produced. The molecular weight or the hydroxyl number is selected properly to result in flexible or semi-flexible foams when the polyol is converted to a polyurethane. The polyols preferably possess a hydroxyl number of from about 50 to about 150 semi-flexible foams and from about 30 to about 70 for flexible foams but can be as low as 20. Such limits are not intended to be restrictive, but are merely illustrative of the large number of possible combinations of the above polyol coreactants.

The most preferred polyols employed in this invention include the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. Most preferably, the ethylene oxide when used is incorporated as terminal blocks, i.e., capping units. Polymer/polyols can be used and are preferred as a part or all of the polyol requirements of the foamable formulation used in this invention and are also well known, the basic patents being the Stamberger patents, U.S. Pat. Nos. 3,304,273; 3,383,351,U.S. Pat. No. Re. 28,715 (reissue of U.S. Pat. No. 3,383,351) and U.S. Pat. No. 3,523,093. Later disclosures of polymer/polols include the Scharf et al. and Kuryla Canadian Pat. Nos. 735,010 and 785,835; the Pizzini et al. U.S. Pat. No. 3,823,201; the Ramlow et al. U.S. patent application, Ser. No. 431,080, filed Jan. 7, 1974; the Ramlow et al. patent U.S. Pat. No. 3,953,393; the DeWald U.S. Pat. No. 3,655,553; and the Shah patent U.S. Pat. No. 4,119,586. These as well as any other suitable polymer/polyol can be employed herein. The polymer of the polymer/polyol is formed by polymerizing one or more polymerizable ethylenically unsaturated monomers. The proportion of polymer in the polymer/polyol can range from about 4 to about 50 weight percent, preferably from about 15 to about 35 weight percent, based on the total weight of the polymer/polyol. The polymer is preferably formed in situ the polyol which can be any of the polyols described above. The polymerizable ethylenicallly unsaturated monomers which can be used making the polymer/polyols employed in this invention include the polymerizable ethylenically unsaturated hydrocarbon monomers and polymerizable ethylenically unsaturated organic monomers the molecules of which are composed of carbon, hydrogen and at least one of O, S, or N. These monomers are characterized by the presence therein of at least one polymerizable ethylenic unsaturated group of the type $>C=C<$. The monomers can be used singly or in combination to produce homopolymer/polyol or copolymer/polyol reactive compositions. These monomers are well known in the art and include the hydrocarbon monomers such as styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; the acrylic and substituted acrylic monomers such as acrylic acid, methacrylic acid, methyl acrylate, 2-hydroxyethyl acrylate, 2-hydroxyethyl methacrylate, methyl methacrylate, octyl methacrylate, acrylonitrile, methacrylonitrile, 2-ethylhexyl acrylate, phenyl acrylate, phenyl methacrylate, N,N-dimethylacrylamide, and the like; the vinyl esters, vinyl ester, vinyl ketones, etc., such as, vinyl acetate, vinyl alcohol, vinyl butyrate, vinyl acrylate, vinyl methacrylate, N-vinyl-pyrrolidone, and the like; the vinyl halides and vinylidene halides, such as, vinyl chloride, vinyl fluoride and vinylidene chloride and the like; t-butylaminoethyl methacrylate, glycidyl acrylate, allyl alcohol, vinyl pyridine, and the like. Any of the known polymerizable monomers can be used and the compounds listed above are illustrative and not restrictive of the monomers suitable for use in this invention. Any of the known chain transfer agents can be present if desired. The preferred monomer used to make the polymer of the polymer/polyol used in this invention is acrylonitrile alone as a homopolymer or in combination with styrene or methyl methacrylate as a copolymer. The relative weight proportions of acrylonitrile to styrene illustratively range from about 20:80 to about 100:0., preferably from about 25:75 to 100:0 and more preferably, when low molecular weight polyols, e.g., below about 2000 are used, then the weight ratio should be from about 60:40 to about 85:15.

The catalysts that ar useful in producing molded cellular flexible polyurethane in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylenediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicyladehyde, cyclopentanone-2-carboxylate, acetylacetoneimine, bis-acetylacetone-alklenediimines, salicyladehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like (f) alcoholates and phenolates of various metals such as $Ti(OR)_4$, $Sn(OR)_4$, $Sn(OR)_2$, $Al(OR)_3$, and the like, wherein R is alkyl or aryl and the reaction products of alcoholates with carboxylic acids, beta-diketones, and 2-(N-N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hesanoate, stannous acetate, stannous octoate, stannous oleate, lead octoate, metallic driers such as manganese and lead naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkytin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctylin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, withouth the use of amines. The catalysts are employed in small amounts, for example from about 0.001 percent to about 5 percent of each, based on weight of the reaction mixture.

It is also within the scope of the invention to employ small amounts, e.g., about 0.01 percent to 5.0 percent by weight, based on the total reaction mixture, of a silicone foam stabilizer. Useful silicone surfactants included blends of one or more polyols as defined hereinabove with a silicone such as an aryl modified dimethyl silicone oil or a polyphenylethylsiloxane copolymer. Other useful silicone surfactants are the "hydrolyzable" polysiloxane-polyoxyalkylene block copolymers such as the block copolymers described in U.S. Pats. Nos. 2,834,748 and 2,917,480. Another useful class of foam stabilizers are the "nonhydrolyzable polysiloxane-polyoxyalkylene block copolymers such as the block copolymers described in U.S. Pat. No. 3,505,377; U.S. patent application No. 888,067, filed Dec. 24, 1969, and British Patent Specification No, 1,220,471. The latter class of copolymers differs from the above-mentioned polysiloxane-poloxyalkylene block copolymers in that the polysiloxane moiety is bonded to polyoxyalkyiene moiety through carbon-to-oxygen-to-silicon bonds. These various polysiloxanes-polyoxyalkylene block copolymers preferably contain from 5 to 50 weight percent of polysiloxane polymer with the remainder being polyoxyalkylene polymer. Any other suitable surfactants or stabilizers can be used.

Any compatible pigment can be used in the foamable mixture used in this invention. Carbon black is extensively used as a pigment in polyurethane products. Other useful pigments include Prussian blue, manganese violet, manganese blue, emerald green, cobalt blue, cobalt violet, Mayan blue, iron oxide red, chrome red, vermillion, ultramarine blue, ultramarine violet, phthalocyanine green and brillant red. The amounts of pigments used are not narrowly critical and depend in large part on the shade of medium to dark color desired. Illustrative ranges are from about 0.1 to about 4 weight percent, perferably about 0.3 to about 2 weight percent of the pigment based on the weight of the polyurethane product. Larger amounts of pigment can be used although difficulties with mixing and handling the larger amounts of pigments can result because of increased viscosity. The pigment can be incorporated into the polyol, the polyisocyanate composition, or both but preferably is added to the preblend.

A small amount of a polyurethane blowing agent, such as, water is used, in the foamable reaction mixture (for example, from about 0.1 to about 5 weight percent of water, based upon total weight of the polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed wil vary with factors such as the density desired in the foamed product.

The organic polyisocyanates that are useful in producing the novel molded flexible polyurethane cellular products in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where eas of processing such materials is desired. The polyisocyanates are well known in the art. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxy-hexane, 1,8-diisocyanatooctane, 1,5-diisocyanato-2,2,4 -trimethylpentane, 1,9-diisocyanatononane, 1,10-diisocyanatopropyl ether of 1,4-butylene glycol, 1,11-diisocyanatoundecane, 1,12-diisocyanatododecane, bis-(isocyanatohexyl) sulfide, 1,4-diisocyanatobenzene 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, 2,4'-diphenylmethylene diisocyanate, modified diphenylmethylene diisocyanates modified with carbodiimides to liquefy same, and polymethylene poly(phenyleneisocyanates) having the formula:

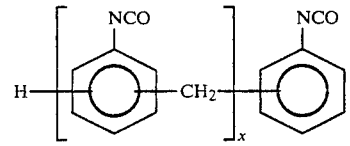

wherein x has an average value from 1.1 to 5 inclusive (preferably from 2.0 to 3.0), and mixtures thereof. A preferred mixture of polyisocyanates comprises 80 wt. % 2,4-tolylenediisocyanate and 20 wt. % 2,6-tolylenediisocyanate.

The following examples are presented. The examples representing this invention are numbered; those examples that are lettered are comparative examples which do not illustrate the invention.

%—percent by weight unless otherwise specified
ratios—are based on weight
parts—parts by weight
pbw—parts by weight
pts.—parts by weight
hrs—hours
mins.—minutes
secs.—seconds
ppm—parts per million by weight
lb—pound
in—inch
psi—pounds per square inch
ft—foot
gms—grams
TDI—Mixture of 80% 2,4-tolylene-diisocyanate and 20% 2,6-tolylenediisocyanate.
Polyol 1 Polypropylene oxide—polyethylene oxide triol made from propylene and ethylene oxides and glycerine and having a theoretical number average molecular weight of about 5000 and a hydroxyl number of about 34 to 35. The alkylene oxide units are present primarily in blocks and the end units are substantially all ethylene oxide units, i.e., the ethylene oxide is used to "cap" the triol. Based on its total weight, this triol contains about 16.5 percent ethylene oxide.
Polyol 2—A polymer/polyol formed by copolymerizing a 50/50 weight ratio mixture of styrene and Ca-crylonitrile in situ in polyol 1 to provide 22 wt. % of styrene-acrylonitrile copolymer content based on the weight of polyol 2. This polymer/polyol has a nominal hydroxyl number of about 28.
Polyol 3—A polymer/polyol formed by copolymerizing a 50/50 wt. ratio mixture of styrene and acrylonitrile in situ in polyol 1 to provide 28 wt. % of styrene-acrylonitrile copolymer content based on the wt. of polyol 3. This polymer/polyol has a nominal hydroxyl number of about 28.
DOA—Diethanolamine
Catalyst 1—A 70 wt. % solution of bis(2-dimethylamino-ethylether in dipropylene glycol.
Catalyst 2—Dibutyltin mercaptide.

Catalyst 3—N,N,N',N',N'''-pentamethyl dipropylenetriamine
Catalyst 4—Formic acid modified Catalyst 4.
Catalyst 5—A blend of Catalyst 4, DABCO and Catalyst 4.
DABCO—A 33 wt.% solution of triethylene diamine in propylene glycol.
Blowing Agent 1—Trichlorofluoromethane
Surfactant1—A blend of 80 pbw polyol 1 and 20 pbw of a polyphenylethylsiloxane copolymer The following ASTM test methods were used in determining the physical properties given in the exmples:

|  | ASTM METHOD |  |
| --- | --- | --- |
| Density, lb/ft$^3$ | D-3574 | Test A |
| Resiliency, % rebound | D-3574 | Test H |
| Porosity, ft$^3$/min/ft$^2$ | — | — |
| IFD$_{50}$, lb | D-3574 | Test B |
| Return value, % | D-3574 |  |
| Load ratio | — | — |
| Tensile, psi | D-3574 | Test E |
| Elongation, % | D-3574 | Test E |
| Tear, lb/in. | D-3574 | Test F |
| Comp set $_{75}$ | D-3574 | Test D |

EXAMPLES 1 and A

Two foam formulations were prepared from the ingredients listed in Table I. Each formulation was prepared by first mixing all of the ingredients except the TDI and blowing agent (trichlorofluoromethane) at 4000 rpm for 55 secs. The trichlorofluoromethane was added after 45 secs. of mixing and mixing was continued for the remaining 10 sec. to make up the 55 sec. of total mixing of the initial ingredients. After mixing was stopped, the TDI was added quickly and mixing was continued for 5 more secs. after which the mixture was quickly poured into a waxed aluminum mold (15"×15"×5") provided with a lid hinged to the mold and four vent holes of 1/16 inch in diameter drilled close to each corner of the lid. The lid is provided with a latch for holding it in closed position. After pouring the resultant mixture into the mold, the lid was closed and latched. The mold temperature was 135° F. The mixture in the mold was allowed to foam and rise and it filled the mold. Some of the foam extruded through the four vent holes. In the case of Example A the foam was allowed to set for 2 mins. from the pour and then was placed in a 250° F. oven for 6 mins. after which the foam of Example A was demolded and immediately crushed in crushing rollers three times. After removal from the mold the foam of Example A was postcured in the oven at 250° F. for 30 mins. and then was tested for physical properties which are listed in Table I.

In the case of Example 1, the mold lid was unlatched 100 secs. after mixing the TDI with the remaining ingredients and pouring into the mold. In Example 1 the foam then was allowed to set for 2 mins. from the pour and then the mold containing the foam was placed in the 250° F. oven for 6 mins. Thereafter the foam was demolded and was not crushed but was subjected to post-cure for 30 mins. at 250° F. The physical properties for the foam of Example 1 are given in Table I. After the post-cure and testing of the Example 1 foam it was crushed by hand after demolding and its resiliency was increased to the level of the Example A foam after roller crushing. Most importantly the foam of Example 1 did not shrink at all upon demolding and post-curing and did not have to be subjected to roller-crushing immediately after demolding to avoid shrinkage. Furthermore, the improvement in resiliency and hand-crushing illustrates the added bonus of obtaining increased resiliency using "user" crushing. A similar improvement in compression set to provide a lower compression set figure is obtained through "user" crushing.

EXAMPLES B to E

In order to illustrate the effects of TPR, comparative specimens B, C, D and E were prepared. In Example B the same formulation as given in Table I and procedures as given above in Example A were used except that the specimen was not subjected to roller crushing after demolding. Example B shows the extreme shrinkage effects of not immediately crushing the foam after removal from the mold so as to open the cells of the foam and avoid the "sucking-in" effects of contracting gases within the cell. Examples C, D and E were carried out in the same manner as described in Example 1 except that in each respective case the mold lid was unlatched at times of 150 sec. (Example C), 125 sec. (Example D), and 75 sec. (Example E) after mixing the TDI with the remaining ingredients. FIG. 2 shows the comparative shrinkage results of Examples B, C, D and E as compared to the non-shrinkage of Example 1. FIG. 2 results show, of course, extreme shrinkage for the Example B foam, extreme but less shrinkage for the Example C foam, small but significant shrinkage of the Example D foam and some foam collapse for the Example E foam. On the other hand, FIG. 2 clearly shows that the Example 1 foam did not shrink nor did it collapse. These examples also show the critical time window of less than 125 secs. to more than 75 secs. More specifically the time window indicated by FIG. 2 was found to be about 85 to 110 sec. from the point of mixing and pouring the TDI into the other ingredients. In Examples 1 and A through E minimum-fill foams were obtained, that is, just enough formulation was added to the mold in each case so that the resulting foam just filled the mold and extruded slightly out of the vent holes.

TABLE I

|  | Example | |
| --- | --- | --- |
|  | A | 1 |
| Formulation, wt. pts. | | |
| Polyol 1 | 60 | |
| Polyol 2 | 40 | |
| H$_2$O | 3.5 | |
| Diethanolamine | 1.58 | |
| Catalyst 1 | 0.15 | |
| DABCO | 0.60 | → |
| Catalyst 2 | 0.0065 | |
| Surfactant 1 | 1.8 | |
| Blowing agent | 8.0 | |
| TDI | 104 Index | |
| Properties | | |
| Molded part weight, gms | 444 | 446 |
| Pressure release time, sec | No release | 100 |
| Crushed? | Yes | No |
| Visible shrinkage | None | None |
| Density, lb/ft$^3$ | 1.55 | 1.45 |
| Resiliency, % rebound | 65 | 41/61* |
| Porosity, ft$^3$/min/ft$^2$ | 42.5 | 26.5 |
| IFD$_{50}$, lb | 32 | 29 |
| Return value, % | 79 | 66 |
| Load ratio | 3.16 | 2.93 |
| Tensile, psi | 13.6 | 11.9 |
| Elongation, % | 110 | 110 |
| Tear, lb/in. | 1.22 | 1.20 |
| Comp set $_{75}$ | 13.7 | 38 |

*Resiliency after hand crushing.

EXAMPLES 2 through 4

In each of these examples the same formulation was prepared in each case and poured into the molds using the same procedures, equipment and techniques as described in Example 1 except that in the case of Examples 2, 3 and 4, respectively, the amount of foamable mixture poured into the mold was, respectively, 6½% more, 7½% more and 10% more than the minimum-fill amount which was used in Example 1, that is, in Example 2, 106.5% of the amount of formulation put into the mold in Example 1 was employed. In Example 3 the amount of formulation put into the mold was 107.5% of that used in Example 1. In Example 4, 110.5% of the amount used in Example 1 was used. FIG. 3 clearly shows that no shrinkage occurred in any of the molded foam products in Examples 1, 2, 3 and 4 indicating that mold packing can be used to expand the critical time window.

EXAMPLE 5

Figure 6:
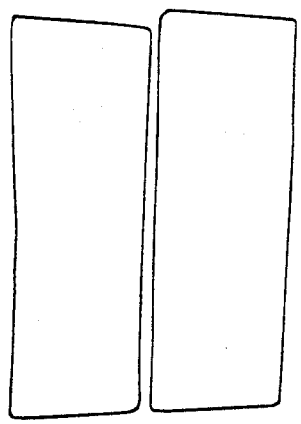

The same formulation as used in Example 1 was poured into a mold using the same formulations and procedures and equipment as described in Example 1 except that 110% of the amount of formulation poured into the mold of Example 1 for minimum-fill was used in Example 5. Also instead of unlatching the mold and thus exposing the molded product to atmospheric pressure at 100 secs., the unlatching rocedure in Example 5 was carried out at 125 secs. FIG. 6 compares the molded product of Example 5 with the molded product of Example D in which a minimum-fill foam was made and unlatching was done at 125 secs. The Example D foam shows some shrinkage while the Example 5 foam showed no shrinkage whatsoever.

Examples 6 and F

Example 6 was carried out in the same manner as Example 1 except that in place of 1.8 wt. parts of silicone surfactant there was used 4.0 wt. parts of silicone surfactant. The resulting molded foam product of Example 6 showed no shrinkage whatsoever as shown in FIG. 5. Example F was carried out in precisely the same manner as Example C but the resulting molded foam product showed a considerable amount of shrinkage but considerably less shrinkage than that obtained in the molded product of Example C. These comparisons illustrate that the amount of silicone-surfactant can be employed to broaden the critical time window.

Examples 7 and G

Example 7 was carried out in the same manner as Example 6 using 4 wt. parts of silicone-surfactant but, however, unlatching the mold at 115 secs. after mixing of the TDI with the other ingredients of the foam formulation. The molded foam product of Example 7 showed no shrinkage.

Example G was carried out in the same manner as Example 1 except that the latch of the mold was released 115 secs. after the mixing of TDI and the other ingredients. FIG. 6 illustrates that the molded foamed product of Example G had some shrinkage as compared to the product of Example 7 which showed essentially no shrinkage. This comparison illustrates that an increased amount of the silicone surfactant can raise the upper limit of the critical time window of 110 secs. to 115 secs.

In molding polyurethane foams in intricate molds, it has become the practice in some cases to increase the amount of surfactant to improve the shear stability of the foam as it goes around corners and avoid collapse. It has been found, heretofore, that increases in surfactant also increases the resistances of the foam to cell bursting by roller crushing, vacuum or air injection and a point is reached where the cells cannot be opened by such conventional techniques. The present invention provides a means for opening cells in those cases where abnormally high amounts of surfactant are needed or used. As demonstrated in the Examples high amounts of surfactant do not interfere with cell opening by the techniques of this invention. In fact, increased amounts of surfactant provide the beneficial effect of broadening to critical time window.

EXAMPLES 8, 9 and H

In these examples the formulation set forth in Table II below were prepared and molded in an Admiral low pressure molding machine having a cylindrical high-shear mixing head having a through-put of 135 lbs. per minute. The machine has provisions for three streams and utilized a stream temperature of 75° F. and a mixer speed of 6000 rpm.

A full bench truck cushion mold having a hinged lid was used in these examples and a release agent was applied to the mold at a temperature of about 155° to 160° F. In each case all of the ingredients except the blowing agent and TDI were preblended and three separate streams, one containing the preblend, another containing the trichlorofluorocarbon blowing agent and the third containing the TDI were mixed in the machine and the resulting mixture poured into the mold and when the minimum-fill amount had been added the mold was closed and latched and put into an oven where it was maintained at 160° to 165° F. for 6.75 mins.

In Example 8, however, the mold lid was unlatched after the passage of 80 secs. after the mixing of the TDI and the other ingredients. In Example 9, the mold lid was unlatched after 85 secs. from the mixing of the TDI and other ingredients. In both instances, releasing of the mold latch exposed the molded foam truck cushion to atmospheric pressure. In the case of Example H the mold lid was not unlatched until the passage of 6.75 mins. in the oven at a temperature of 160° to 165° F. At the end of this period of time, in Example H the molded foamed truck cushion was removed from the mold and immediately subjected to crushing in crushing rollers. Thereafter, it was post-cured at 250° F. for 30 mins. In both Examples 8 and 9, the molded foamed truck cushions were maintained at 160° to 165° F. for 6.75 mins. Thereafter they were not subjected to crushing but were post-cured at 250° F. for 30 mins. Table II below provides the physical properties for the molded foamed truck cushions product in Examples 8, 9 and H. In the case of Example 9 the driver's side of the truck cushion was subjected to "user" crushing by sitting on the driver's side of the cushion and shifting the weight several times. The most significant result of Examples 8 and 9 was that there was no noticeable shrinkage of the truck cushion after demolding and there was no need to crush the foamed truck cushion for the purpose of avoiding shrinkage. It was also important to note that after "user" crushing in Example 9A the resiliency increased to approximately that of crushed foam of Example H and the compression set dropped to approximately that of said crushed foam. Most significantly, however, shrinkage was avoided in Examples 8 and 9 without the need for mechanically crushing the foamed cushion immediately after demolding.

TABLE II

| | Example | | | | |
|---|---|---|---|---|---|
| | 8 | H | 9 | A | B |
| Formulation | | | | | |
| Polyol 1 | 60 | | | | |
| Polyol 2 | 40 | | | | |
| H$_2$O | 3.5 | | | | |
| Diethanolamine | 1.53 | | | | |
| Catalyst 1 | 0.15 | | | | |
| DABCO | 0.60 | → | → | | |
| Catalyst 2 | 0.0065 | | | | |
| Surfactant 1 | 1.8 | | | | |
| Blowing agent 1 | 8.0 | | | | |
| TDI | 104 Index | | | | |
| Properties | | | | | |
| Molded part weight, gms | 2100 | 2095 | 2110 | | |
| Pressure release time, sec | 80 | Not Released | | 85 | |
| Crushed? | No | Yes | Yes | No | No |
| Visible shrinkage | No | No DS | No PS | No DS* | No PS |
| Density, lb/ft$^3$ | 1.60 | — | — | — | — |
| Resilience, % rebound | 37 | 52 | 48 | 49 | 29 |
| Porosity, ft$^3$/min/ft$^2$ | 9.6 | 29 | 27 | 32 | 12 |
| IFD$_{50}$, lb | 24.3 | 21/6 | 19.4 | 22.6 | 21 |
| Return value, % | 70.1 | | | | |
| Load ratio | 2.8 | | | | |
| Tensile, psi | 17.8 | | | | |
| Elongation, % | 152 | | | | |
| Tear, lb/in. | 1.57 | | | | |
| Comp set 75 | 68 | 25 | 25 | 25 | 42 |

PS - Passenger side
DS - Driver's side
*Driver's side "user" crushed by sitting on driver's side for a few minutes and shifting weight a few times.

EXAMPLE 10

Using the procedures of Example 1, the formulation given in Table III below was prepared and molded to produce foam. The mold latch in each case was released to expose the molded foam to atmospheric pressure after the passage of different amounts of time from the mixture of TDI with the other ingredients. By this procedure it was found that the critical time window for mold latch release for this formulation and the mold of Example 1 was in the range of 70 to 100. It was also found that molded foamed articles produced within this range of timed pressure release did not exhibit any shrinkage. The preferred TPR for this example was found to be 90 seconds.

TABLE III

| | pbw |
|---|---|
| Polyol 1 | 60 |
| Polyol 3 | 40 |
| Diethanolamine | 1.7 |
| Water | 4.0 |
| Catalyst 4 | 0.26 |
| Catalyst 3 | 0.15 |
| Catalyst 2 | 0.005 |
| Surfactant 1 | 1.3 |
| TDI | 103 Index |

EXAMPLE 11

Using the procedures of Example 1, the formulation given in Table IV below was prepared and molded to produce a molded foam product. The mold latch in each case was released to expose the molded part to atmospheric pressures after passage of different amounts of time from the mixture of TDI with the other ingredients. By this procedure it was found that the critical time window for mold latch release for this formulation and the mold of Example 1 was in the range of 70 to 120. It was also found that molded foamed articles produced within this range of timed pressure release did not exhibit any shrinkage. The preferred TPR for this example was found to be 105 seconds

TABLE IV

| | pbw |
|---|---|
| Polyol 1 | 60 |
| Polyol 3 | 40 |
| Diethanolamine | 1.6 |
| Water | 3.6 |
| Catalyst 5 | 0.35 |
| DABCO | 0.05 |
| Catalyst 2 | 0.0035 |
| Surfactant 1 | 1.5 |
| Blowing agent 1 | 2.0 |
| TDI | 103 Index |

The critical time window has been found in all foamable, flexible polyurethane reaction systems examined. We have found that the exact occurrence of the critical time window in point of time, measured from the start of the polyurethane forming reaction, i.e., time of mixing the polyisocyanate and polyol(s), is dependent upon the curing speed characteristic of the polyurethane-forming formulation and the conditions of curing having an effect on curing speed. For example, comparing two formulations that are identical except for the amount of catalyst, in the one containing more catalyst the critical time window would occur sooner in the cure cycle than in the one containing less catalyst. Furthermore, comparing two identical formulations, one being molded and foamed in thick walled metal mold and the other in a thin walled metal mold which is otherwise identical to the thick walled mold, the thick walled mold is likely to remain at a higher temprature for a longer period thus tending to speed up the curing and the critical time window could be expected to occur sooner. Similarly, larger mold cavities hold a larger amount of exotherming polymerizing reaction mass and tend to generate more heat and higher tempratures for longer periods of time than smaller mold cavities and can be expected to shift the critical time window downward.

The critical time window for any foamable, flexible, polyurethane-forming formulation and for any molding system can be readily determined empirically by running a comparative timed pressure release study similar to that described in Examples 1 and B–E. The critical time window is determined as the range of time extending from the time when the foam just withstands collapse upon exposure to atmospheric pressure to the time of exposure to atmospheric pressure when the foam begins to show signs of shrinking after cooling. The optimum time of pressure release can be selected at the mid area of the critical time window.

The present invention is broadly applicable to any flexible or semi-flexible, foamable, polyurethane-forming formulation and to any molding system for foaming, polymerizing and molding such formulations and there are no limits on the shapes of foamed, flexible polyurethane molded products that can be produced by this invention.

What is claimed is:

1. A process for making molded high resilience polyurethane cellular products which do not substantially shrink or change dimensionally upon cooling comprising
   (a) introducing a liquid foamable polyurethane preaction mixture into a mold adapted to expose the curing product to atmospheric pressure during the curing of said product and said mold adapted to be closed,
   (b) closing said mold,
   (c) permitting said reaction mixture to expand into contact with the confines of the mold to form a curing molded polyurethane cellular product containing cells having cell walls of curing polyurethane and pressurized expansion gases contained within and supporting said cell walls,
   (d) exposing said curing product to atmospheric pressure while in contact with the confines of the mold at a time when said cell walls of said curing polyurethane cellular product have cured sufficiently to develop sufficient strength to avoid collapse of the cells of said product upon exposure to atmospheric pressure but before said cell walls have cured sufficiently to develop sufficient strength to resist bursting by the pressure of said expansion gases contained within said cell wall upon expose to atmospheric pressure,
   (e) allowing said curing polyurethane product to continue to cool and cure in said mold until it has developed sufficient strength to be removed from the mold without permanently distorting its shape, and
   (f) removing said product from said mold.

2. Process as claimed in claim 1 wherein said mold is provided with a closeable port connecting the interior of said mold with the atmosphere and said port is closed during the steps of introducing said reaction mixture into the mold and permitting said mixture to expand and said exposing step is conducted by opening said port.

3. Process as claimed in claim 1 wherein said mold comprises mold halves held closed by a latch and said step of exposing the curing polyurethane product to atmospheric pressure is conducted by unlatching said latch.

4. Process as claimed in claim 1 wherein a solid insert is placed in said mold before permitting said formable reaction mixture to expand and thereafter said formable reaction mixture is permitted to expand around said insert.

5. Process as claimed in claim 1 wherein said insert is a rigid support member for said molded high resilience polyurethane cellular product.

6. Process as claimed in claim 1 wherein said molded high resilience polyurethane cellular product is an automotive seat.

7. Process as claimed in claim 5 wherein said molded high resilience polyurethane cellular product is an automotive seat.

8. Process as claimed in claim 1 wherein said molded high resilience polyurethane cellular product contains unburst cells within it and is allowed to cool and post-cure and thereafter is subjected to crushing forces during its intended use to crush unburst cells deep within said product thereby improving its resilience.

9. Processing as claimed in claim 5 wherein said molded high resilience polyurethane cellular product contains unburst cells deep within it and is allowed to cool and post-cure and thereafter is subjected to crushing forces during its intended use to crush unburst cells deep within said product thereby improving its resilience.

10. Process as claimed in claim 8 wherein said molded high resilience polyurethane cellular product is automotive seat containing unburst cells deep within it and is allowed to cool and post-cure and thereafter is sat upon shifting weight several times to crush unburst cells deep within the seat.

11. Process as claimed in claim 1 wherein said time, when said cell walls have cured sufficiently to develop sufficient strength to avoid collapse of the cells but have not cured to the extent of becoming sufficiently strong that said cell walls resist bursting upon exposure to atmospheric pressure, is extended by introducing into said mold more than the minimum amount of foamable mixture needed upon full foaming to fill the mold.

12. Process as claimed in claim 11 wherein the amount of foamable mixture introduced into said mold is from 100% to 135% of said minimum amount.

13. Process as claimed in claim 1 wherein said foamable mixture contains a silicone surfactant and said time, when said cell walls have cured sufficiently to develop sufficient strength to avoid collapse of the cells but have not cured to the extent of becoming sufficiently strong that said cell walls resist bursting upon exposure to atmospheric pressure, is extended by increasing the amount of silicone surfactant used in said foamable mixture.

14. Process as claimed in claim 13 wherein the amount of said silicone surfactant contained in said foamable mixture can range from a conventional amount to three times the conventional amount.

15. Process as claimed in claim 14 wherein the amount of silicone surfactant ranges from about 1 wt. part to 5 wt. parts per 150 wt. parts of foamable mixture.

16. A process for making molded high resilience polyurethane cellular products which do not substantially shrink or change dimensionally upon cooling comprising:
   (a) introducing a liquid foamable polyurethane reaction mixture into a mold having means for closing said mold, and optionally having a closable port;
   (b) closing said mold,
   (c) permitting said reaction mixture to expand into contact with the confines of the mold to form a curing molded polyurethane cellular product containing cells having cell walls of curing polyurethane and pressurized expansion gases contained within and supporting said cell walls;
   (d) exposing said curing product to atmospheric pressure while in contact with the confines of the mold by either opening the mold or opening said port approximately 70 to 110 seconds after the reaction mixture was introduced into the mold; and
   (e) allowing said curing polyurethane product to continue to cool and cure in said mold until it has developed sufficient strength to be removed from the mold without permanently distorting its shape, and
   (f) removing said product from said mold.

17. The process as claimed in claim 16 wherein a solid insert is placed in said mold before permitting said foamable reaction mixture to expand and thereafter said foamable reaction mixture is permitted to expand around said insert.

18. The process as claimed in claim 17 wherein said insert is a rigid support member for said molded flexible polyurethane cellular product.

* * * * *